US008867342B2

(12) United States Patent
Mathur et al.

(10) Patent No.: US 8,867,342 B2
(45) Date of Patent: Oct. 21, 2014

(54) ADAPTIVE STANDBY ACCESS IN A LOCAL AREA COMMUNICATION NETWORK

(75) Inventors: Tushar Mathur, Lucknow (IN); Anil Kaushik, Bangalore (IN); Raj Kiran, Kaggadaspura (IN); Senthilraj Shanmugavadivel, Coimbatore (IN); Vijay Yadav, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 224 days.

(21) Appl. No.: 13/537,192

(22) Filed: Jun. 29, 2012

(65) Prior Publication Data

US 2014/0003230 A1 Jan. 2, 2014

(51) Int. Cl.
*H04L 1/00* (2006.01)
(52) U.S. Cl.
USPC .......................................... 370/229; 370/237
(58) Field of Classification Search
None
See application file for complete search history.

(56) References Cited

U.S. PATENT DOCUMENTS

| 6,934,298 | B2 | 8/2005 | Bentley |
| 7,688,712 | B2 | 3/2010 | Glapin et al. |
| 8,134,985 | B2 | 3/2012 | Hong |
| 2006/0148485 | A1 | 7/2006 | Kangas et al. |
| 2008/0002633 | A1* | 1/2008 | Pandey et al. ............ 370/338 |
| 2010/0259308 | A1* | 10/2010 | Wang et al. ............... 327/175 |
| 2011/0038349 | A1 | 2/2011 | Sun et al. |
| 2011/0205969 | A1* | 8/2011 | Ahmad et al. ............ 370/328 |
| 2012/0057503 | A1* | 3/2012 | Ding et al. ............... 370/254 |

FOREIGN PATENT DOCUMENTS

| EP | 1943863 | 2/2011 |
| WO | 2011018639 | 2/2011 |

OTHER PUBLICATIONS

XIRRUS Tablets & Smart Phones "BYOD: Are You Ready?" undated.

* cited by examiner

*Primary Examiner* — Ayaz Sheikh
*Assistant Examiner* — Mariela Vidal Carpio
(74) *Attorney, Agent, or Firm* — Brian M. Mancini

(57) ABSTRACT

An adaptive standby access point in a local area communication network includes an interface operable to communicate with other access points, at least one radio operable to communicate with user devices utilizing at least one antenna, and a processor operable to receive a message over the interface from one of the other access points that is experiencing traffic overload. The message indicating to the standby access point that the one other access point requires traffic demand assistance, whereupon the processor will activate and direct the radio to send out beacons to solicit user devices within the coverage area of the overloaded access point to instead association with the standby access point.

13 Claims, 4 Drawing Sheets

ADAPTIVE STANDBY ACCESS IN A LOCAL AREA COMMUNICATION NETWORK

FIELD OF THE DISCLOSURE

The present invention relates generally to local area communication networks and more particularly to an adaptive standby access point in a local area wireless communication network.

BACKGROUND

Wireless local area communication networks (WLAN) such as IEEE 802.11 wireless communication networks are able to provide communications for their users utilizing wireless access support, in the form of wireless access points or access ports, collectively referred to herein as access points (AP). Due to its convenience, WLAN usage and client density is increasing day by day and WLAN can be deployed in many different locations having different characteristics. For example, some locations will not see a large number of clients being served by a single AP (like in an enterprise). However, most public locations (like a retail shop) would see an uneven number of clients per AP. Further, there could be sudden burst of users trying to associate to a single AP. Further still, in an enterprise there is a trend to bring your own device (BYOD), where a single user could bring multiple wireless devices, which increases the load on a single AP. As a result, the load on a limited numbers of APs is ever increasing, even if such load might be just a temporary traffic demand. There are various algorithms to provide load balancing across APs. However, there are particular issues with load balancing that need to be solved.

The simplest solution to load balancing is to hand off user devices from a more heavily loaded AP to a less loaded AP. However, this can be an issue where APs have different capabilities. For example, handing off a device capable of high data rates to an AP with a lower data rate capability will result in slowing down that user device. This will also impact the overall throughput of the AP since more time will be needed to handle all the data of the device. Another solution is to increase the power level of a neighboring AP, such that a user device will find a better signal with that AP and hand off to it. However, increasing a power level of an AP will result in more network interference, which is undesirable. Along the same lines, lowering the power of a serving AP may drop service to a user device, which is also undesirable. These disruptions can no longer be planned for during an initial capacity planning and layout of APs in the network due to the infiltration of communication-intensive devices such as smartphones and tablets.

Accordingly, there is a need for new technique to relieve an AP from a sudden temporary burst of user devices requiring service on that AP.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
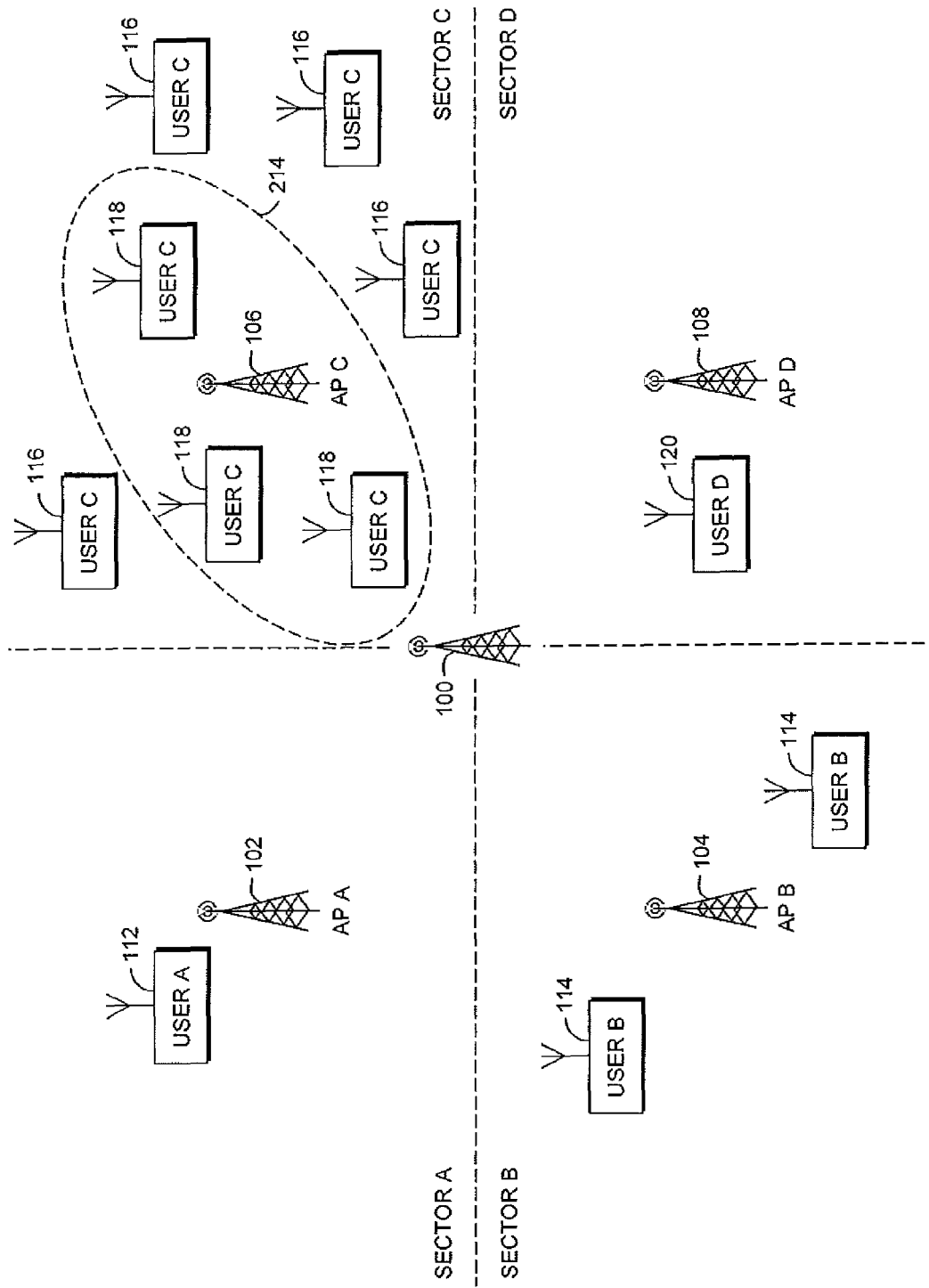
FIG. 1 is a simplified block diagram of a communication network, in accordance with one embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In practice, in many customer scenarios such as warehouses and huge retail stores or a supermarket, there can be a lot of Wi-Fi users, and there may be a case where lesser number of APs is supporting a huge volume of user devices and traffic. This reduces the bandwidth allocation per user and reduces the throughput of those APs. Once an end-user experiences low bandwidth, he/she may desire to move away from that overloaded AP to some other location which can offer a better throughput. In another example, a field installation customer could have purchased a sufficient number of APs to provide its staff good Wi-Fi accessibility. However, there may arise a particular scenario where there are too many communication-intensive devices in one section-A (i.e. users who have their own smartphones, tablets, etc.) of the building and at the same time less usage in another Section-B of the same building. In this scenario, the Section A users start experiencing a very poor throughput. In the above two cases it can be observed that there may be several APs which are experiencing a heavy flow of traffic and are not able to allocate a sufficient airtime for each of its users.

The present invention provides a novel technique to relieve an access point (AP) from a sudden temporary burst of user devices requiring service on that AP. In particular, the present invention introduces an adaptive standby access point that can have multiple antennas that are switchable between multiple radios. The antennas can be sectorized to provide service in a particular direction to support an AP which is nearing its user capacity or traffic threshold by providing additional throughput. For the time that this support is needed, a radio can be locked with antenna elements serving a particular sector based on a feedback mechanism.

FIG. 1 is a block diagram depiction of a wireless local area (e.g. Wi-Fi) communication network, such as an IEEE 802.11 wireless communication system. However, it should be recognized that the present invention is also applicable to a communication system operable in a network that may be based on different wireless technologies. For example, the description that follows can apply to an access network that is IEEE 802.xx-based, employing wireless technologies such as IEEE's 802.11, 802.16, or 802.20, modified to implement embodiments of the present invention. In this network, user devices 112-120 can communicate wirelessly through serving APs 100-108. The user devices can communication with each other or to devices external to the network (not shown), through an Internet connection for example.

Those skilled in the art will recognize that FIG. 1 does not depict all of the network equipment necessary for system to operate but only those system components and logical entities particularly relevant to the description of embodiments herein. For example, an access point, eNodeB, or base station can be connected with or comprise one or more devices such as wireless area network stations (which include access nodes, Media Access Controllers, AP controllers (and/or switches), base transceiver stations, base site controllers, packet control functions, packet control units, and/or radio network controllers. However, none of these other devices are specifically shown in FIG. 1. The APs 100-108 can communicate with either other with a wireless or wired (e.g. Ethernet) connection (not shown). Such communication can be a direct communication or a communication relayed through a higher level network entity such as a switch, controller, resource manager, and the like.

Figure 2:
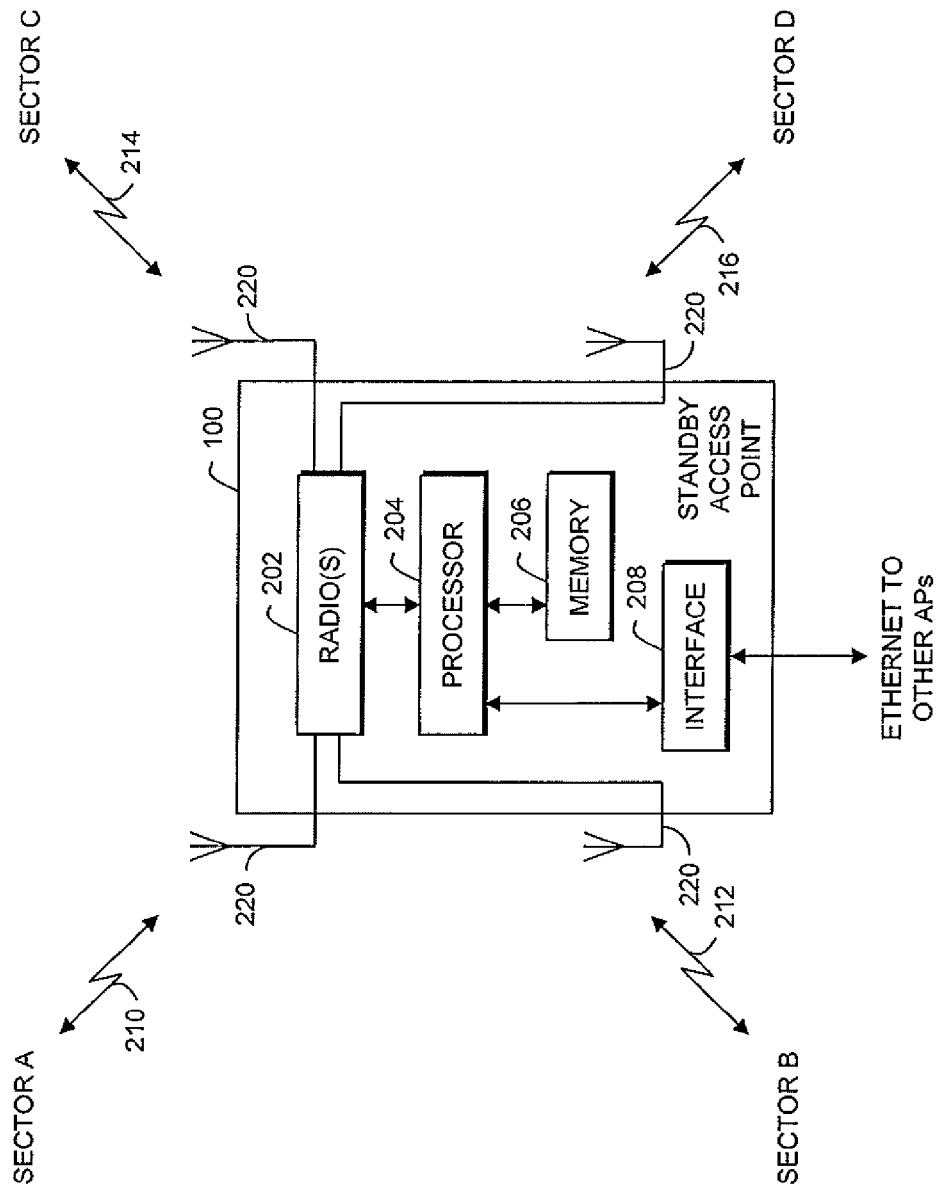
FIG. 2 is a simplified block diagram of an adaptive standby access point, in accordance with another embodiment of the present invention.

Referring to FIG. 2, there is shown a block diagram of an adaptive standby access point (AP) 100 adapted to support the inventive concepts of the embodiments of the present invention. AP 100 is depicted as comprising a processor 204 coupled to at least one radio transceiver 202 that can be switchably coupled to one or more of multiple antennas 220, a memory 206, and an interface 208 such as an Ethernet interface to communicate with other access points and network entities. In general, components such as processors, radios, transceivers, antennas, memories, and interfaces are well-known. For example, the at least one radio 202 is operable to communicate with user devices over an IEEE 802.11 interface. In addition, AP processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement an AP processor that performs the given logic. Therefore, AP 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the AP aspect of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

The APs use a local area wireless interface for communication with multiple user devices (User A . . . User D). The local area wireless interface corresponds to a forward link and a reverse link used in communications between the user devices and their serving AP. User devices, stations or remote unit platforms are known to refer to a wide variety of consumer electronic platforms such as mobile stations, mobile units, mobile nodes, user equipment, subscriber equipment, subscriber stations, access terminals, remote terminals, terminal equipment, gaming devices, personal computers, and personal digital assistants, and the like, all referred to herein as client devices. In particular, each client device comprises a processor that can be coupled to a transceiver, antenna, a keypad, a speaker, a microphone, and a display, as are known in the art and therefore not shown.

User devices are known to comprise basic components such as, but not limited to, microprocessors, digital signal processors (DSPs), microcontrollers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

Referring back to FIG. 1, an embodiment of the present invention is shown which introduces the concept of an adaptive standby AP for a wireless local area network. In the network, a plurality of APs 102-108 are distributed to provide service coverage for different sectors, areas or ranges covering a service area of the network. It should be noted that in practice there can be many sectors, and not just the four shown. In addition, the sectors could be of any size and shape, and not just the regular rectangular pattern shown. Moreover, sectors could overlap to some degree.

In accordance with the present invention, a Standby AP 100 can be provided that is centrally located in the network. Normally, this Standby AP is not communicating (i.e. in sleep or standby mode). When any AP 102-108 finds that it is becoming overloaded with user traffic, this overloaded AP can call on the Standby AP 100 to wake up and assist with the traffic demand in the sector of the overloaded AP. Overloaded traffic demand can be exhibited by limitations in any one or more of bandwidth, data rate, data throughput, user or application priority, quality of service, error rates, number of connections or served devices, and the like.

In operation, each AP 102-108 has an omnidirectional antenna which provides a roughly circular coverage area (not shown) in its sector. These circular coverage areas generally overlap between APs such that a mobile user device can handoff between APs when it roams through the network without dropping its call. In order to provide traffic demand assistance to the other APs, the Standby AP is centrally located amongst the other sectors in the network. If this is not feasible, multiple Standby APs can be provided to cover substantially all sectors in the network. The Standby AP 100 can also have an omnidirectional antenna which provides a roughly circular coverage area that can overlap the other sectors. However, this may provide poor coverage and cause too much interference, and therefore it is preferred that the Standby AP have antennas configured to provide sectorized coverage areas in the network. In the example shown in FIGS. 1 and 2, the Standby AP provides a set of antenna elements to serve each sector (e.g. four sets for the four sectors A-D respectively). In this way, a radio in the Standby AP can be switched to the particular antenna elements that provide a specific sector coverage area (e.g. 214) to assist AP C 106 with traffic demand in sector C, for example.

In particular, if the traffic demand on an AP (e.g. AP C 106 serving too many user devices C 116-118) in any sector exceeds a predefined threshold, this would trigger that overloaded AP to contact the Standby AP 100 in order to assist with the traffic demand in that overloaded AP's sector in order to dynamically adapt demand without overburdening the AP and dropping communication traffic. Preferably, the Standby AP 100 includes multiple radios that can switchable connect to multiple sectorized antenna(s) that provide wireless coverage only for particular sectors. Ordinarily, a single antenna element will provide omnidirectional coverage. Therefore, the present invention envisions multiple elements for each sectorized antenna for covering each sector, wherein the multiple antenna elements can be configured to cover only one sector, using a cardioid configuration or beam steering for example, as are known in the art and need not be discussed here.

In the example shown, AP C 106 is overloaded with user devices C 116-118, and although the circular coverage area of AP C 106 in Sector C could communicate with all the user devices C 116-118 in that sector, the sectorized coverage area 214 of the Standby AP 100 can permit the overloaded AP C 106 to handoff a portion of its user devices C 118 in that coverage area 214 to the Standby AP 100, wherein AP C 106 can continue to service the remaining portion of user devices C 116.

The use of multiple radios can allow the Standby AP to serve different sectors simultaneously. For example, one radio can be connected to the sectorized antenna(s) serving sector C while another radio can be connected to the sectorized antenna(s) serving sector B. Optionally, more than one radio can be connected to the sectorized antenna(s) serving sector C, for example. Further, to avoid interference in the commonly covered sector, the radio to be utilized by the Standby AP in a sector can be chosen to provide a channel of operation different than any channel being used by the overloaded AP in that sector, wherein that chosen radio can be switchably connected to the antenna serving that sector of the overloaded AP. When the overload condition is alleviated, by a determination that an AP can handle all the user device traffic demand in its sector (i.e. the sum of the traffic from the devices being served by both the AP and the Standby AP), the Standby AP can handoff all the user devices it is presently serving back to the AP, whereupon the Standby AP can enter sleep/standby mode again.

Figure 3:
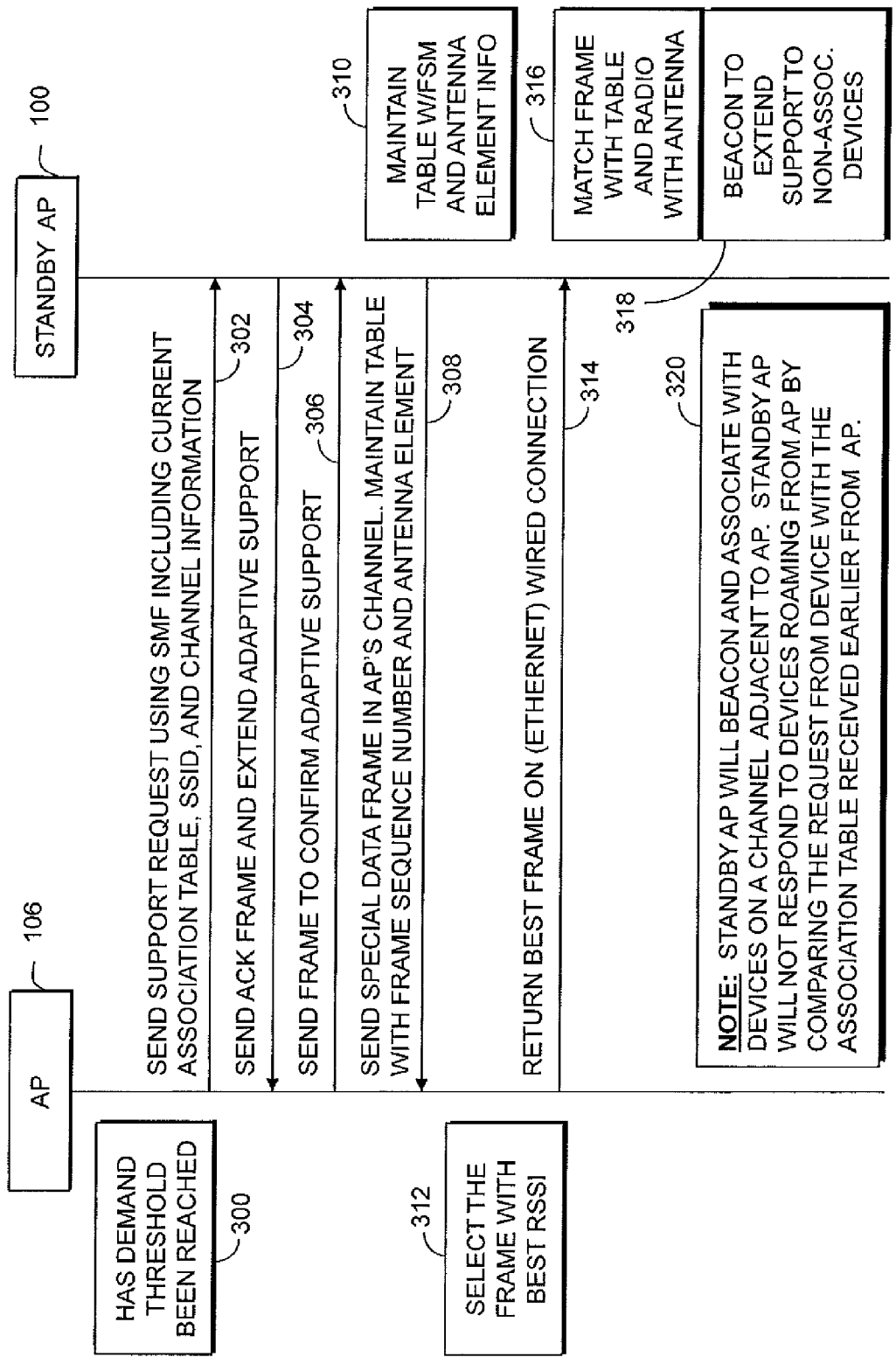
FIG. 3 is a flow diagram of system operation to engage the standby access point, in accordance with another embodiment of the present invention.

FIG. 3 illustrates a process flow to engage the Standby AP in accordance with the present invention. In operation, the present invention will have each sector AP check 300 to see if a traffic demand threshold, $T_D$, has been reached. This threshold can be set by a network administrator. The threshold can be set for one or many traffic demand parameters including one or more of bandwidth, data rate, data throughput, user or application priority, quality of service, error rates, number of connections or served devices, and the like. To decrease process latency, the check is performed only at or near a maximum for the threshold. In the example described herein, sector C has a very large number of wireless devices associated to it, and AP C has a fixed threshold to support the traffic demand (e.g. a maximum number of devices) with adequate airtime allocation.

If an AP determines that one of its traffic demand thresholds has been reached, that AP will send a multicast request 302 including a Special Multicast Frame (SMF), in accordance with the present invention, requesting traffic demand support with an associated client list. A multicast frame is used for those instances where there are multiple Standby APs, otherwise a unicast frame can be used. The special part of the multicast frame is just a multicast frame with source address being a special multicast address. In particular, all sector APs maintain a table of associated clients and create a corresponding associated clients Media Access Control (MAC) table. In the example described herein, when the number of devices that associate with a sector AP meets a threshold (e.g. a maximum of thirty), the table gets fully populated and no more new clients are allowed to associate. In order to allocate acceptable airtime to all the clients presently being served, when a new wireless device requests for association (which would exceed the threshold), the serving AP sends a multicast request, which contains the current association table, the AP Service Set Identifier (SSID) of the WLAN, and current channel being used by the radio, to the Standby AP through a wired (Ethernet) connection requesting support for sharing the clients in the overloaded sector.

The Standby AP replies by sending 304 an acknowledge frame (ACK) on the wired (Ethernet) connection back to the requesting AP, which acts as an offer packet to provide backup support.

The AP can then reply back 306 by an ACK accepting/confirming the backup support from the Standby AP and stating that it is in a ready state to receive the backup support.

The Standby AP responds by sending 308 a special data frame (SDF), in accordance with the present invention, on the operating wireless channel of AP (from the support request 302) that sequences through all of the available sectorized antennas. The special data frame run of the standby AP can be limited to about thirty seconds, for example. The data frames sourced from the Standby AP will includes the Source and Basic SSID address set to a Reserved MAC address, which will help the serving AP to identify that the frame is been transmitted by the Standby AP. The reserved MAC is used to identify the frame as a pilot frame however any other tagged field could be used to mark it as pilot frame, or some other mechanism can be used to differentiate the pilot frame. The Standby AP maintains 310 a table for the SDF frames sent through the different sectorized antennas, with the antenna sequence number and the selected antenna as attributes. If the Standby AP has multiple radios, the table can also include the radio used for each antenna. In particular, the Standby AP initiates a sequential run on all the sectorized antennas (e.g. sectors A-D) including the SDF. It sends a sequence of these SDF frames in such a manner that it maintains a sequence number of the data packet as well as the corresponding sectorized antenna in a sequential table. For example, Table 1 shows one entry of this sequential table that is the third frame sent in the sequence indicating that it is the third frame sent and that this third frame used the Standby AP antenna for sector C. (Sequence #1 uses the Sector A antenna, sequence #2 uses the Sector B antenna, sequence #3 uses the Sector C antenna, and sequence #4 uses the Sector D antenna.)

TABLE 1

Special Data Frame Sequence Number By Antenna Example

| SPECIAL DATA FRAME SEQUENCE NUMBER | CORRESPONDING ANTENNA ELEMENTS |
|---|---|
| #3 | SECTOR C |

The sector AP will listen to the sequential SDF frames from each Standby AP antenna, e.g. SDF frame 1 from sector antenna A, SDF frame 2 from sector antenna B, SDF frame 3 from sector antenna C (as in Table 1), and SDF frame 4 from sector antenna D. As it listens, the sector AP will measure the received signal strength (RSSI) of each frame. For example, the AP internally maintains a table that holds the respective signal strength values of each received SDF frame. Table 2 shows the third and highest RSSI entry of this table, in this example. The SDF frame received with the highest received signal strength is selected 312 from the table as the Standby AP antenna that would best serve the AP's sector.

TABLE 2

Respective Special Data Frame Values Example

| BSSID OF ADAPTIVE STANDBY AP | Rx SPECIAL DATA FRAME SEQUENCE NUMBER | RSSI VALUE OF Rx FRAME (dBm) |
|---|---|---|
| 00:11:11:11:11:11 | #3 | −40 |

(NOTE: RSSI values are negative.)

The sector AP can then encapsulate the frame received with the best RSSI value (e.g. the SDF of Table 1), and return 314 this frame to the multicast MAC of the Standby AP over the wired (Ethernet) connection. The Standby AP needs this information to select the best antenna to provide the backup support from the requesting sector.

Upon receipt of the returned SDF frame (Table 1), the Standby AP can match (316) the frame with its maintained table to find the antenna (and radio) used to originally send (308) that frame. In the example used herein, the returned frame is the same originally sent SDF frame from Table 1 identifying the third sequenced antenna serving sector C as the preferred choice. The Standby AP can then connect and lock the radio with the matched antenna in the table maintained by the Standby AP. The Standby AP will activate its radio and direct it to start beaconing to solicit user devices within the coverage area of the sector access point using the same security parameters as the AP. Inasmuch as the sector AP has the ability to support the devices it is already serving, the Standby AP will only extend support to, and associate with, user devices in the supported sector (C) which are not part of the association table originally received (302) from the sector AP, and only on a different (adjacent) wireless channel (320) than the channel being used as indicated by the sector AP in its original request (302). It should be noted (320) that the Standby AP will not respond to association requests from devices roaming from the sector AP by comparing any association request from a device with the association table received (302) earlier from the sector AP. The Standby AP will continue beaconing and associating with new devices in the sector until AP C sends a disengage request to the Standby AP.

Figure 4:
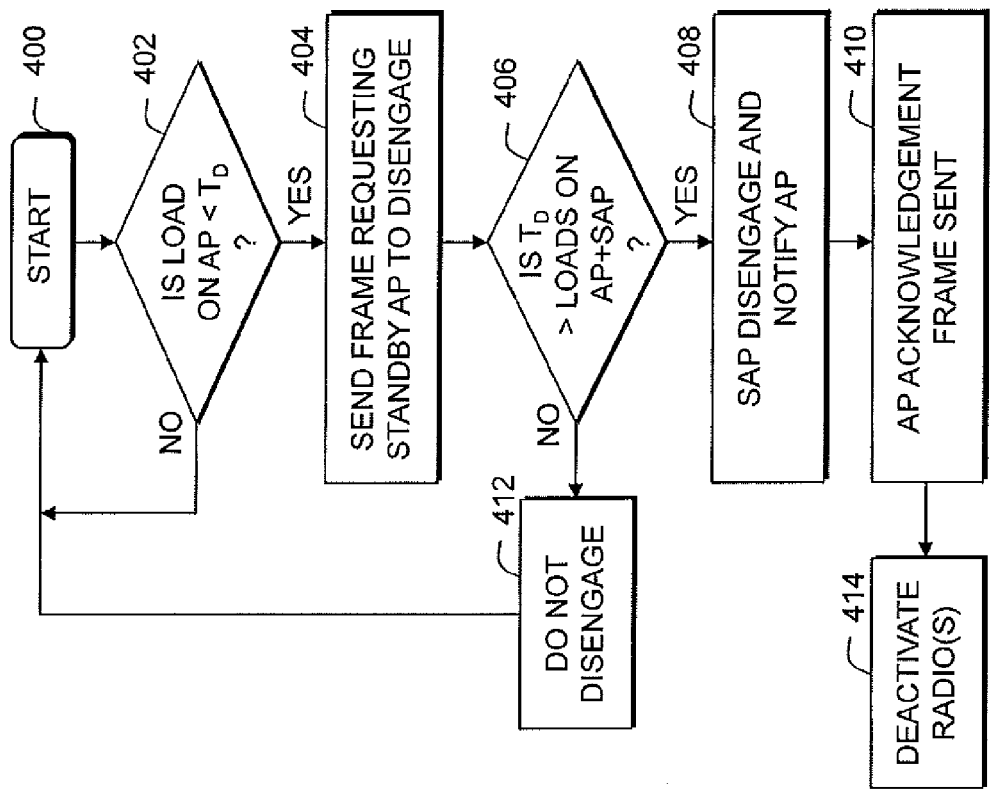
FIG. 4 is a flowchart of a method of system operation to disengage the standby access point, in accordance with another embodiment of the present invention.

FIG. 4 illustrates the process flow for disengaging the Standby AP, in accordance with the present invention. To disengage, the standby access point is operable to hand off all its associated user devices to the one other access point and deactivate the at least one radio upon an indication that the one other access point is able to handle the total traffic demand of its associated user devices plus the user devices associated with the standby access point. In practice, the sector AP will check 402 to see if the traffic demand from its currently served devices falls below the demand threshold, $T_D$. If not, the AP will continue checking until the demand does fail below the demand threshold. When the demand fails below the demand threshold, the AP can then serve more devices, whereupon the AP will send (404) a disengage request in a unicast frame to the Standby AP. The unicast frame can also include a demand parameter indicating an amount of traffic demand on the AP along with the demand threshold, $T_D$. The Standby AP can add the traffic demand from the sector AP to the present traffic demand on the Standby AP. If the sum of the traffic demands still exceeds what the sector AP can handle, $T_D$, then the Standby AP will not disengage 412 and can report this to the AP in a NACK frame such that the AP and the Standby AP can maintain their client association status. However, if the sum of the traffic demands is less than the demand threshold, the Standby AP can send an ACK frame to notify the AP about accepting the disengage request 408, whereupon the Standby AP deauthenticates/deassociates the devices it is serving so that they can hand off to the AP. The AP then replies with (410) an ACK frame to confirm the same, whereupon the Standby AP deactivates (414) its radio(s) and listens for a new SMF request (i.e. 302) on the wired connection.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An adaptive standby access point in a local area communication network, comprising:
   an interface configured to communicate with other access points in the communication network;
   at least one radio configured to communicate with user devices in the communication network, the at least one radio to be switched between multiple antennas; and
   a processor coupled to the interface and the at least one radio, the processor configured to receive a request over the interface from one of the other access points, the request indicating to the standby access point that the one other access point requires traffic demand assistance, whereupon the processor will activate and direct the at least one radio to send a sequence of data frames to the one other access point on a channel being used by the one other access point, each data frame in the sequence being sent by the at least one radio using a different antenna, and each data frame in the sequence indicating its sequence and the antenna being used to send that data frame, receive a reply over the interface from the one other access point including a selected frame of the sequence that was received with the strongest signal strength by the one other access point, connect the at least one radio to the indicated antenna in the selected frame, and send out beacons using the indicated antenna to solicit user devices within the coverage area of the one other access point to associate with the standby access point.

2. The standby access point of claim 1, wherein the standby access point is at a centralized location in the local area communication network.

3. The standby access point of claim 1, wherein the multiple antennas providing sectorized antenna coverage.

4. The standby access point of claim 3, wherein the at least one radio is switched to the indicated antenna by the processor.

5. The standby access point of claim 3, wherein the multiple antennas are switched between multiple radios, wherein different radios are used for different sectors.

6. The standby access point of claim 1, wherein the request includes a current association table of user devices being served by the one other access point and channels being used by the one other access point.

7. The standby access point of claim 6, wherein a radio to be utilized by the standby access point provides a channel of operation different than a channel being used by the one other access point.

8. The standby access point of claim 7, wherein the standby access point will only associate with user devices responding to the beacon that are not in the association table.

9. The standby access point of claim 8, wherein after the standby access point associates with the user devices, the standby access point is configured to hand off all its associated user devices to the one other access point and deactivate the at least one radio upon an indication that the one other access point is able to handle the total traffic demand of its associated user devices plus the user devices associated with the standby access point.

10. The standby access point of claim 1, where the processor will not respond to association requests from devices roaming from the one other access point.

11. The standby access point of claim 1, wherein the traffic demand is represented by a number of user devices associated with the one other access point.

12. A system to provide access point support in a communication network, comprising:
   access points deployed in sectors within the communication network; and
   an adaptive standby access point, comprising;
      an interface configured to communicate with other access points in the communication network;
      at least one radio configured to communicate with user devices in the communication network, the at least one radio to be switched between multiple antennas; and
      a processor coupled to the interface and the at least one radio, the processor configured to receive a request over the interface from one of the other access points, the request indicating to the standby access point that the one other access point requires traffic demand assistance, whereupon the processor will activate and direct the at least one radio to send a sequence of data frames to the one other access point on a channel being used by the one other access point, each data frame in the sequence being sent by the at least one radio using a different antenna, and each data frame in the sequence indicating its sequence and the antenna being used to send that data frame, receive a reply over the interface from the one other access point including a selected frame of the sequence that was received with the strongest signal strength by the one other access point, connect the at least one radio to the indicated antenna in the selected frame, and send out beacons using the indicated antenna to solicit user devices within the coverage area of the one other access point to associate with the standby access point.

13. A method to provide support for access points deployed in sectors within a communication network, the method comprising:

providing a standby access point including an interface configured to communicate with other access points in the communication network and at least one radio configured to communicate with user devices in the communication network, the at least one radio to be switched between multiple antennas;

receiving a request for traffic demand assistance over an interface from one of the other access points;

activating at least one radio of the standby access point;

directing the at least one radio to send a sequence of data frames to the one other access point on a channel being used by the one other access point, each data frame in the sequence being sent by the at least one radio using a different antenna, and each data frame in the sequence indicating its sequence and the antenna being used to send that data frame, receive a reply over the interface from the one other access point including a selected frame of the sequence that was received with the strongest signal strength by the one other access point, connect the at least one radio to the indicated antenna in the selected frame, and send out beacons using the indicated antenna to solicit user devices within the coverage area of the one other access point; and associating the user devices within the coverage area of the other access point with the standby access point.

* * * * *